Sept. 15, 1959  L. A. EARLES, JR  2,904,225
PASTE TUBE HOLDER, DISPENSER AND CLOSURE DEVICE
Filed April 10, 1957

INVENTOR
LOUIS A. EARLES, JR.

BY

ATTORNEY

United States Patent Office 2,904,225
Patented Sept. 15, 1959

2,904,225

PASTE TUBE HOLDER, DISPENSER AND CLOSURE DEVICE

Louis A. Earles, Jr., Spencer, W. Va., assignor to Gustave Miller, Washington, D.C.

Application April 10, 1957, Serial No. 651,870

1 Claim. (Cl. 222—183)

This invention relates to a paste tube holder, dispenser and closure device and has for an object to provide a device for holding, dispensing and automatically closing paste tubes such as toothpaste, shaving creams, and other paste types of dispensers conventionally known.

It is an object of this invention to provide a holder within which the conventional paste tube may be placed and then wherein the paste tube may be held for dispensing the paste as desired and automatically closing the tube and withdrawing any paste back toward the tube without providing any separable paste tube cap.

A further object of this invention is to provide a holder device within which the paste tube is initially placed and left therein with the conventional paste tube cap removed and then when paste is desired, the entire holder is picked up in one hand and manipulated both by squeezing the holder and sealing an aperture through the side thereof so that the air in the holder is compressed about the paste tube to force the paste tube to dispense paste through a spout provided by the holder and then when sufficient paste has been dispensed, the aperture is unsealed permitting the compressed air to escape then it is resealed as by putting a thumb back thereon and the squeezing pressure is released from the holder whereby the holder returns to its normal shape causing a suction on the dispensing spout that cleans the dispensing spout of any paste therein and seals the spout until further use.

A further object of this invention is to provide a dispensing holder made of only two parts, one of which is a barrel with an integral spout thereon within which the paste tube is placed and the other of which is a closure member for the end of the barrel which may be removably secured or threaded thereto, and acts as a base on which the barrel may stand in convenient position ready for use.

A further object of this invention is to provide a paste tube holder within which the paste tube is positioned, the holder being provided with a dispensing spout to cooperate with the paste tube holder, and being apertured therethrough so that the aperture may be sealed manually by holding one thumb thereover as desired during the manipulation for dispensing the paste.

In brief, the paste tube holder, dispenser and closure device of this invention is a tube or barrel of semi-rigid material having an internally threaded spout integrally extending from one end thereof and terminating in a ribbon shaped passageway which is preferably wave-shaped with the opposite wall surfaces complementary to each other, the end of the barrel adjacent the threaded spout being of an internal diameter substantially equal to the external diameter of the paste tube so that it will snugly hold the paste tube end therein while the remaining diameter of the barrel is somewhat larger and has an aperture through the side thereof so that there will be space for air about the remaining portion of the tube, and a base is threadedly secured to the other end of the barrel for holding the tube therein and permitting the entire device to be stood upright.

With the above and related objects in view, this invention consists in the details of construction and combination of parts, as will be more fully understood from the following description, when read in conjunction with the accompanying drawing in which.

Figure 1:
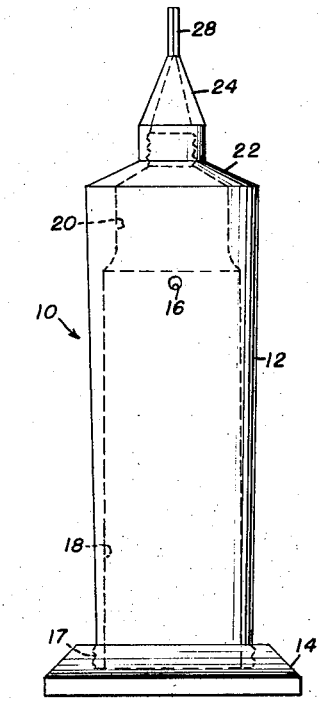
Fig. 1 is a side perspective partly phantom view of the paste tube holder dispenser and closure device of this invention.
Figure 3:
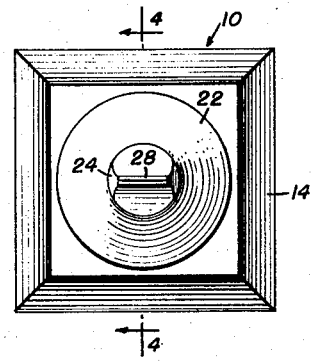
Fig. 3 is a top plan view of the device.
Figure 2:
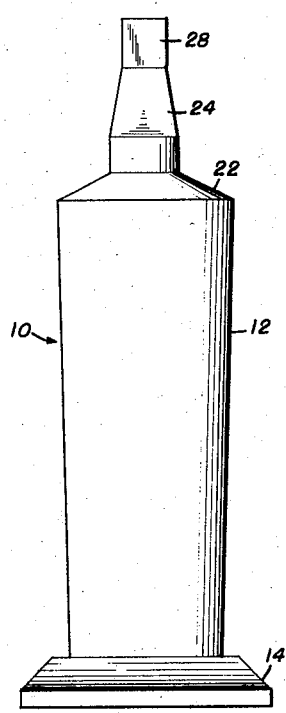
Fig. 2 is an elevational view at right angles to Fig. 1.
Figure 4:
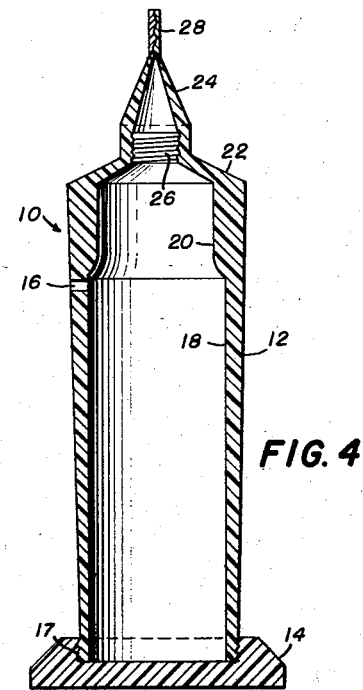
Fig. 4 is a sectional view on line 4—4 of Fig. 3.

There is shown at 10 the paste tube holder, dispenser, and closure device of this invention consisting generally of two separable parts, a barrel 12 and a base 14, the barrel 12 being of a semi-rigid material so that it may be squeezed and is flexible, but always normally tends to return to its original shape and position. A suitable type of material is one of the well-known plastic materials such as used in squeeze bottles or semi-rigid rubber or other similar plastic materials of the proper dimensions and proper flexibility. The base 14 may be of the same material which by its thickness will be sufficiently rigid and heavy to act as a base as well as a closure, the lower end of the barrel 12 being externally threaded as at 17 so that it may be threadedly secured and received within a complementary threaded circular recess in the base 14 so as to be removably secured thereto.

At the base end of the barrel 12, the internal diameter of the barrel is slightly larger than the external diameter of the paste tube to be received therein, and an aperture 16 is provided adjacent the upper end of the larger diameter area 18 and above the aperture 16 the internal diameter of the barrel 12 is reduced as at 20 to be substantially equal to the external diameter of the paste tube to be received therein.

Extending from the top shoulder 22 of the barrel 12 is an integral spout 24. This spout 24 is internally threaded as at 26 so as to snugly receive the threaded neck of a paste tube therein, whereby the paste tube may have its neck threaded into the spout 24 at 26, and the shoulder of the paste tube will abut against the inside of the inside of the shoulder 22 of the barrel 12 while the top portion of the paste tube will be snugly received within the area 20 of the barrel 12. The remainder of the paste tube will fit loosely within the area 18, being inserted through the lower end of the barrel 12 while the bottom base 14 is temporarily removed therefrom. The bottom end of the paste tube is normally sealed, and this sealed end may be bent a slight bit so it will fit within the bottom end of the barrel 12.

Extending from its circular internally threaded portion 26, the spout 24 tapers into a ribbon shaped flexible resilient dispensing tip 28 which is provided with a wave-shaped dispensing passage 30 therethrough, the opposite walls of the passageway 30 being provided with alternate lateral protuberances and depressions complementary to each other as at 32 and 34 which separate under pressure to permit paste 36 to dispense therethrough in a flat ribbon-shaped portion 38 which is especially desirable so that it may lie on the bristles of a toothbrush in the case where the invention is used with a toothpaste tube.

Figures 5, 6:
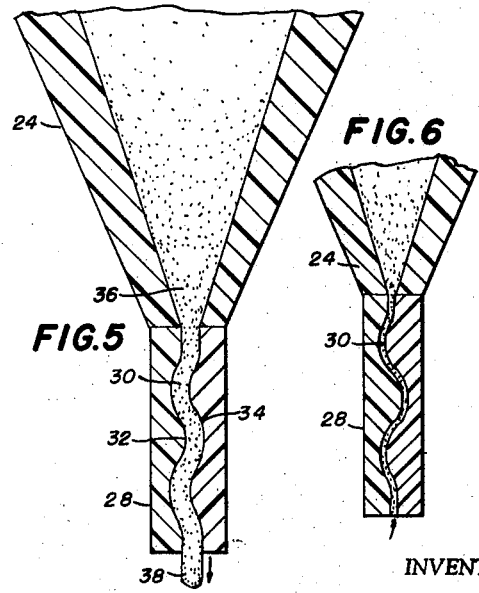
Fig. 5 is an enlarged fragmentary sectional view of the spout in paste dispensing position.
Fig. 6 is a similar fragmentary view of the spout in sealed position.

In operation, a toothpaste or other paste tube is inserted in the barrel 12 while the bottom 14 is temporarily unthreaded therefrom, and the toothpaste tube has its threaded neck threaded into the threaded portion 26 of the spout 24. The upper shoulder of the tube and upper end of the tube fits snugly within the upper area 20 and inside of the shoulder 22 of the barrel 12. The bottom end of the tube where it is sealed may have to be bent somewhat so as to fit into the bottom end of the barrel 12, but this is no difficulty, particularly in view of the fact that the bottom area 18 is slightly larger than the diameter of the tube. Then the botom 14 is secured back on the barrel 12, and the holder, dispenser and closure device is ready for use at any time. To dispense the paste 36 in a ribbon portion 38, it is only necessary to grasp the barrel 12 in one hand placing the thumb over the aperture 16 to seal the same and then squeeze the barrel. This compresses the air about the paste tube therewithin and likewise compresses the tube both through air pressure and through manual pressure. This causes the paste 36 to flow through the wave shaped passageway 30, the pressure causing the opposite wall surfaces 32 and 34 to separate from each other permitting the paste to flow through and be discharged in a ribbon-shaped portion 38. When sufficient paste has been dispensed, the thumb is removed from the aperture 16 permitting the compressed air about the tube to escape, and then when the air is escaped, the thumb is placed back on the aperture 16 and the squeezing pressure on the tube 12 is released, permitting the barrel 12 to return to its normal cylindrical shape. This, of course, causes a vacuum within the space between the tube and the area 18 within the barrel 12 thereby creating a suction on the outside of the tube, thus causing the tube to tend to suck the paste 36 back toward the tube and thus draw the opposite passageway walls 32 and 34 back toward each other to the position shown in Fig. 6, thus effectively sealing the spout after removing the paste between the passageway walls 32 and 34. Then with the spout thus sealed, the holder 10 is placed on its base 14 in a convenient position until it is again needed.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A paste tube holder, dispenser and closure device of semi-rigid material comprising a barrel, a nipple integrally extending from one end of said barrel, said nipple being internally threaded at its barrel connecting end to snugly receive the threaded neck of a paste tube therein, a flat ribbon like spout of flexible resilient material extending from the opposite end of said nipple and having a wave shaped dispensing passageway extending therethrough, the opposite wall surfaces of said passageway comprising alternate protuberances and depressions complementary to each other and normally in contact with each other, the internal diameter of said barrel closely adjacent said nipple end being substantially equal to the external diameter of the paste tube to snugly contact the paste tube adjacent the nipple end, the remaining portion of the barrel having an internal diameter greater than said nipple end area to thereby provide a space between the barrel wall of such position and the paste tube, said barrel having an air aperture in the spaced area thereof, said aperture being adjacent the snug fitting area, and a barrel bottom removably threaded thereto of substantially greater diameter than the barrel diameter providing a supporting base, whereby a paste tube may be received and supported within said barrel with the paste tube neck threaded into said spout, and the paste in the tube may be dispensed in ribbon shape through said spout by manually sealing said aperture and squeezing said barrel to create air pressure thereabout, and then said spout may be emptied of paste back toward the paste tube by suction by manually unsealing said aperture while maintaining squeezing pressure on said barrel, permitting the air pressure to escape, then manually resealing said aperture and releasing said squeezing pressure to permit said barrel to expand to normal diameter.

References Cited in the file of this patent

UNITED STATES PATENTS

| | | |
|---|---|---|
| 1,382,135 | Stafford | June 21, 1921 |
| 1,794,577 | Brell | Mar. 3, 1931 |
| 2,117,071 | Ring | May 10, 1938 |
| 2,209,665 | Scheringer | July 30, 1940 |
| 2,564,359 | Fuller | Aug. 14, 1951 |
| 2,804,995 | Fee | Sept. 3, 1957 |